United States Patent [19]

Bossé et al.

[11] Patent Number: 4,743,835

[45] Date of Patent: May 10, 1988

[54] OUTPUT HOLD-UP CIRCUIT FOR A STEP-UP VOLTAGE REGULATOR

[75] Inventors: Bertrand Bossé; Thomas Gati, both of Chomedey-Laval, Canada

[73] Assignee: Unisys Corporation, Blue Bell, Pa.

[21] Appl. No.: 92,421

[22] Filed: Sep. 3, 1987

[51] Int. Cl.$^4$ .............................................. G05F 1/569
[52] U.S. Cl. .................................... 323/266; 323/222; 361/18
[58] Field of Search ............... 323/222, 224, 266, 282, 323/285, 299, 908; 363/20, 21, 56; 361/18

[56] References Cited

U.S. PATENT DOCUMENTS

| | | | |
|---|---|---|---|
| 3,889,177 | 6/1975 | Fendrich, Jr. ...................... | 323/266 |
| 4,016,461 | 4/1977 | Roland .................................. | 361/18 |
| 4,063,306 | 12/1977 | Perkins et al. ......................... | 363/56 |
| 4,533,986 | 8/1985 | Jones ..................................... | 323/222 |

Primary Examiner—Peter S. Wong
Attorney, Agent, or Firm—Glenn W. Bowen; Laurence J. Marhoefer

[57] ABSTRACT

An arrangement for enhancing the available energy storage capability of a hold-up energy storage element for use with the step-up or boost regulator stage of a power supply enables use of smaller hold-up storage elements, such as capacitors. The circuit stores energy at the boost regulator output and returns the energy either to the regulator input in the event of a transient line failure, or to the regulator output during a load transient. The invention provides improved transient fault tolerance by increasing the hold-up time of the storage element.

15 Claims, 1 Drawing Sheet

OUTPUT HOLD-UP CIRCUIT FOR A STEP-UP VOLTAGE REGULATOR

BACKGROUND OF THE INVENTION

The invention relates generally to apparatus for enabling continuous operation of power supplies during transient fault conditions. More specifically, the invention concerns a storage element for a step-up or boost voltage regulator which is switchable between the regulator input and output depending upon the location of the transient fault.

Known DC power supplies use an energy storing element, such as a large capacitor, across the output. This so-called "hold-up" capacitor serves as a compensating device for load changes and as an energy source for the load for use during a transient line fault condition. The capability for maintaining the power supply output to the load within a specified tolerance during a faulty line condition is important, for example, in computer system power supply applications where it is desired to transfer data in volatile memory to a nonvolatile storage device during the transient condition in case the power supply problem persists to the point where the computer system would have to be shut down. The longer the hold-up time required, the larger the required capacitance. Large capacitor banks are expensive and take up excessive physical space in the power supply housing equipment.

SUMMARY OF THE INVENTION

It is, therefore, an object of this invention to provide increased hold-up time during power supply transient fault conditions, while minimizing the required size of the energy storage element used.

It has been discovered that the gain characteristics of a voltage step-up or boost regulator may be advantageously utilized in a hold-up circuit for such a regulator supply by providing coupling apparatus operative to switch the hold-up storage element to the regulator output during a load transient or to the regulator input during a line transient fault.

It is a feature of the invention that, when switched to regulator input, the hold-up storage element will enable proper power supply operation for a longer transient fault condition with the same size storage element required in the prior art, in that the inherent gain of the regulator is applied to the energy received from the hold-up circuit prior to energy consumption at the load.

BRIEF DESCRIPTION OF THE DRAWING

These and other objects and features of the invention will become apparent from a reading of a detailed description of a preferred embodiment taken with the drawing in which.

DETAILED DESCRIPTION

Figure 1:
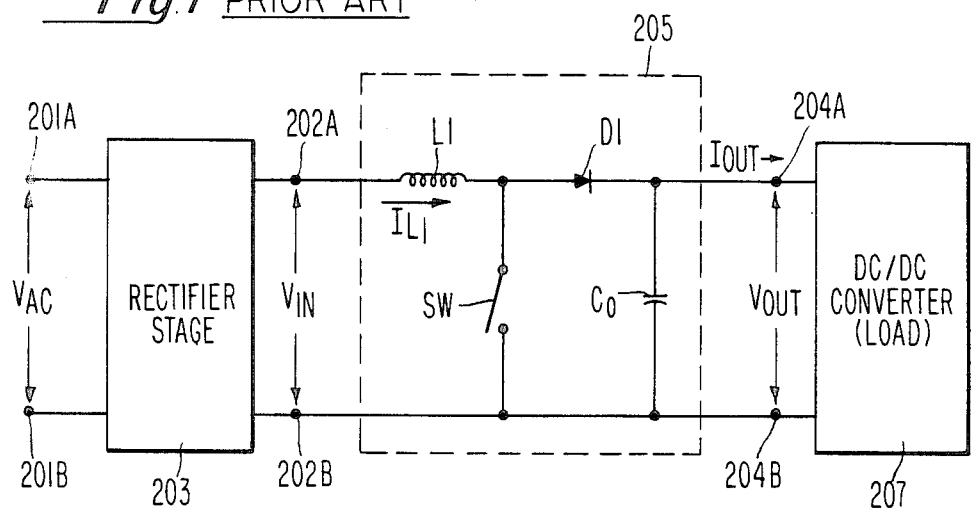
FIG. 1 depicts a prior art power supply system with a boost regulator driving a DC/DC converter stage as its load and having a conventionally configured hold-up capacitor permanently associated with the boost stage regulator output.

The prior art power supply system set forth in FIG. 1 takes an AC line voltage appearing at terminals 201A and 201B, rectifies the voltage to an input level $V_{IN}$ at stage 203 and presents the input voltage across terminals 202A and 202B of a voltage step-up or boost regulator stage 205. The output voltage of boost stage 205, which is higher than the input voltage $V_{IN}$ is presented at terminals 204A and 204B to a load 207 which could, for example, comprise a DC/DC converter.

Step-up regulator 205 is of conventional design wherein an inductor L1 is coupled between terminal 202A and one side of an electronic switch SW. Coupled to the same side of switch SW is an anode electrode diode D1, whose cathode electrode is coupled to the regulator output at terminal 204A. Coupled to input terminal 202B of regulator 205 is another contact of switch unit SW. Coupled across the output of boost stage 205 is an output capacitor $C_0$.

Regulators such as the boost stage 205 provide an output voltage $V_{OUT}$ greater than the input voltage $V_{IN}$. In the case of such a step-up or boost regulator, when switch SW closes, the applied voltage thereacross drops to almost zero and voltage $(V_{IN}-V_{SW})$ is applied across inductor L1 causing the inductor current $I_{L1}$ to increase linearly. Because the switch voltage is less than the output voltage, diode D1 is reverse-biased. The load current $I_{OUT}$ is then supplied by the output capacitor $C_0$. Again, when switch SW opens, the inductor current $I_{L1}$ cannot change instantly, and the switch voltage changes to the total of the output voltage $V_{OUT}$ plus the diode voltage. At this time, current can flow through the diode to the output capacitor $C_0$ and the load 207, and the inductor current $I_{L1}$ decreases at a linear rate, determined approximately by $V_{OUT}-V_{IN}$. Timing adjustments in operating switch SW control the average diode current, so that it is held approximately equal to the load current.

As will be apparent to those skilled in the art, it may be mathematically shown that the gain, A, of a boost or step-up regulator such as 205 of FIG. 1 is $A=V_{OUT}/V_{IN}$ which is approximately equal to $1/(1-D)$, where D is the duty cycle of switch SW (i.e., the on time of switch SW divided by the on time plus the off time of switch SW).

It will also be apparent that the useful hold-up energy available from capacitor $C_0$ during a line fault will be given by $E=\frac{1}{2}C_0(V_{OUT}^2-V_{OUT-MIN}^2)$, where $V_{OUT-MIN}$ is the minimum output voltage of the regulator tolerated by the load for proper operation.

Figure 2:
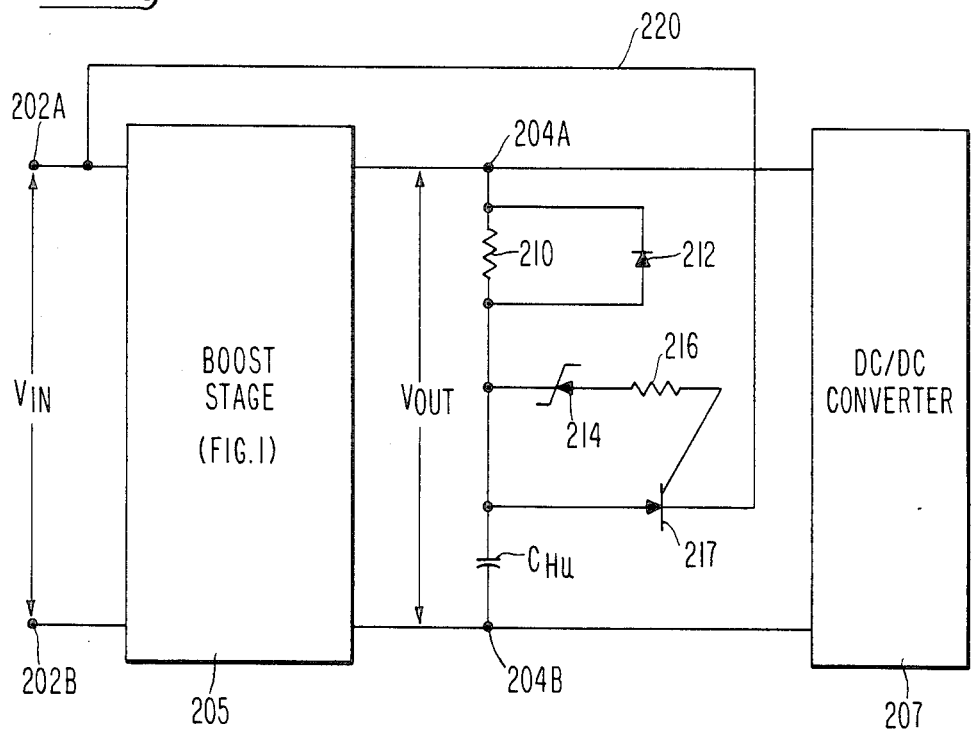
FIG. 2 sets forth hold-up circuitry arranged in accordance with the principles of the invention as such circuitry would be added to the power supply system of FIG. 1.

The improved hold-up arrangement of the invention is shown added to the prior art power supply of FIG. 1 in FIG. 2. Boost stage 205 essentially the same as that shown in detail in FIG. 1 and still retains a smaller output shunting capacitor $C_0$ to help maintain a minimized ripple voltage at the regulator output (it can be shown that the peak-to-peak ripple voltage of a step-up regulator is inversely proportional to the capacitance appearing across the regulator output).

Between output terminals 204A and 204B of regulator 205 is placed a serial connection of resistor 210 and hold-up capacitor $C_{HU}$. Coupled to the junction of capacitor $C_{HU}$ and resistor 210 is an anode electrode of silicon controlled rectifier 217, which has its cathode electrode coupled via lead 220 to input terminal 202A of boost stage regulator 205. The gate electrode of rectifier 217 is coupled through resistor 216 to an anode electrode of zener diode 214, whose cathode electrode is coupled to the junction of capacitor $C_{HU}$ and resistor 210. Coupled across resistor 210 is diode 212 having its anode electrode coupled to the junction between capacitor $C_{HU}$ and resistor 210 and having its cathode electrode coupled to output terminal 204A.

Resistor 210 is relatively large for inrush current protection and comprises the charging path for capacitor $C_{HU}$ during transient free or fault free operation of the power supply. Alternatively, capacitor $C_{HU}$ could be charged from a source separate from the output of step-up regulator 205. For example, a small auxiliary charging circuit could be used. In any case, under normal operating conditions, the hold-up capacitor $C_{HU}$ will have charged to approximately the nominal voltage of the regulator $V_{OUT}$. Should the DC/DC converter 207 encounter a fast load transient, the voltage across the boost stage output would decrease, thereby rendering diode switch 212 conductive which enables the energy stored in capacitor $C_{HU}$ to be furnished to the load via diode 212 for the duration of the transient interval.

In the case of a transient fault condition occurring at the line side of the power supply, the input voltage $V_{IN}$ would fall to a point which would break down the zener diode 214 in the gate circuit of silicon control rectifier 217, thereby rendering rectifier 217 conductive. With rectifier 217 conductive, the energy stored in the hold-up capacitor $C_{HU}$ is now made available to the input of boost stage 205. For this case, the useful hold-up energy available is $$E = \tfrac{1}{2}C(V_{OUT}^2 - V_{IN\text{-}MIN}^2)n$$

Where n is the efficiency of boost stage 205, and $V_{IN\text{-}MIN} = V_{OUT}/A_{MAX}$, with $A_{MAX}$ being the maximum gain of boost stage 205.

It will be seen that width the hold-up energy supplied to the input of the boost stage 205, an improvement factor is generated over prior art hold-up arrangements which were permanently associated with the boost stage otput. This improvement or energy multiplying factor enables use of smaller capacitors for $C_{HU}$ using the principles of the invention when compared to the size required for capacitors of prior art arrangements yielding the same useful hold-up time interval. Assuming the capacitances are the same, dividing the latter equation for useful hold-up energy by the priorly derived equation for the prior art arrangement yields an improvement factor of $$K = \frac{(1 - (V_{IN\text{-}MIN}/V_{OUT})^2)n}{1 - (V_{OUT\text{-}MIN}/V_{OUT})^2}$$

Since $V_{IN\text{-}MIN}$ is much smaller than $V_{OUT\text{-}MIN}$, the improvement factor K is greater than unity (typically on the order of 2–5).

The invention has been described with reference to a preferred embodiment which is given for the sake of example only. Other arrangements and components could be used while still falling within the scope and spirit of the invention. For example, the storage element for the hold-up unit is not necessarily limited to the use of an electrical capacitor, but could include other energy storage elements such as batteries. As a further example of an alternative arrangement, one could use an optical coupling arrangement in place of the zener reference in the gate circuit of SCR 217 to reflect the need for switching $C_{HU}$ across the regulator input. The scope and spirit of the invention is to be defined by the appended claims.

What is claimed is:

1. In a voltage regulator having an input for receiving a DC input voltage and an output for furnishing a DC output voltage to a load, improved means for sustaining the output voltage within a predetermined tolerance during fault conditions comprising:
   energy storage means; and
   coupling means coupled to the energy storing means, the input and output of the regulator and the load, the coupling means operative, during fault-free operation of the regulator and load, to couple the energy storage means for charging to a predetermined voltage level, the coupling means further operative, upon an occurrence of a fault condition at the regulator input, to couple the energy storage means across the regulator input.

2. The improvement of claim 1 wherein the coupling means couples the energy storage means to the regulator output for charging to substantially the regulator output voltage during fault-free operation.

3. The improvement of claim 1 wherein the coupling means is further operative, upon the occurrence of a fault condition at the load, to couple the energy storage means across the load.

4. The improvement of claim 2 wherein the coupling means is further operative, upon the occurrence of a fault condition at the load, to couple the energy storage means across the load.

5. The improvement of claim 3 wherein the coupling means comprises:
   first switching means having a first terminal coupled to the energy storage means, a second terminal coupled to the regulator input, and control means coupled for detecting a fault condition at the regulator input, the control means operative to detect the input fault and, upon detection, to set the first switching means to a conductive state between its first and second terminals.

6. The improvement of claim 5 wherein the coupling means further comprises:
   second switching means having a first terminal coupled to the energy storage means, a second terminal coupled to the load, and means operative to detect a load fault and, upon detection, to set the second switching means to a conductive state between its first and second terminals.

7. The improvement of claim 2 wherein the coupling means further comprises impedance means coupled between the storage means and the regulator output for providing a charging path to the storage means.

8. The improvement of claim 6 wherein the coupling means further comprises impedance means coupled between the storage means and the regulator output for providing a charging path to the storage means and the impedance means is coupled in parallel with the second switching means.

9. The improvement of claim 1 wherein the storage means comprises an electrical capacitor.

10. Apparatus for storing energy at an output of a step-up voltage regulator supplying a load with an output voltage greater than the regulator input voltage, the apparatus comprising:
    energy storage means coupled between first and second regulator output terminals;
    a first electronic switch, coupled between the energy storage means and a regulator input terminal, operative to couple the energy storage means to the regulator input terminal upon occurrence of a regulator input fault condition;

a second electronic switch, coupled between the energy storage means and the load, operative to couple the energy storage means to the load upon the occurrence of a load fault condition; and charging path means coupling the energy storage means to the regulator output for charging during fault-free regulator and load operation.

11. The apparatus of claim 10 wherein the energy storage means comprises an electrical capacitor.

12. The apparatus of claim 10 wherein the charging path means comprises an electrical resistance.

13. The apparatus of claim 10 wherein the first electronic switch comprises a silicon controlled rectifier having an anode terminal coupled to the energy storage means, a cathode terminal coupled to the regulator input and a gate electrode coupled to the anode electrode.

14. The apparatus of claim 10 wherein the second electronic switch comprises a diode having an anode electrode coupled to the energy storage means and a cathode electrode coupled to the regulator output.

15. A hold-up circuit for a power supply having a step-up voltage regulator with a regulator input coupled for receipt of rectified line voltage and a regulator output coupled to a load, the hold-up circuit comprising:

a hold-up capacitor and a charging resistor serially coupled across the regulator output;

a controlled rectifier and a zener reference diode, the rectifier having an anode electrode coupled to a junction of the hold-up capacitor and charging resistor, a cathode electrode coupled to the regulator input, and a gate electrode coupled to an anode electrode of the zener diode, with the anode electrode of the rectifier additionally coupled to a cathode electrode of the zener diode; and a diode having an anode electrode coupled to the junction of the capacitor and resistor and a cathode electrode coupled to the regulator output.

* * * * *